Dec. 30, 1969    A. A. PARON    3,486,490
INTERNAL COMBUSTION ENGINE AND PISTON THEREFOR
Filed June 13, 1968    2 Sheets-Sheet 2

INVENTOR.
AUGUST A. PARON
BY James V. Harmon
ATTORNEY

United States Patent Office 3,486,490
Patented Dec. 30, 1969

3,486,490
INTERNAL COMBUSTION ENGINE AND PISTON
THEREFOR
August A. Paron, 999 3rd Ave. NW.,
New Brighton, Minn. 55112
Filed June 13, 1968, Ser. No. 736,655
Int. Cl. F02b 33/04, 33/12
U.S. Cl. 123—73                                     9 Claims

ABSTRACT OF THE DISCLOSURE

A two-cycle internal combustion engine of the type in which the piston skirt is used for controlling the intake of air from the carburetor to the crankcase is provided with an inlet port in the piston skirt. The port is positioned to allow the charge to flow from the carburetor to the crankcase as soon as the upper end of the piston closes the bypass ports. A one-way valve consisting of a reed valve or a disk valve is provided on the inside surface of the skirt of the piston adjacent to the inlet port to seal the inlet port as soon as the piston begins its downward travel thereby preventing the flow of the gas from the crankcase to the carburetor through the inlet port.

---

The present invention relates to internal combustion engines and more particularly to an improved valving system for regulating the flow of gas from the carburetor to the crankcase of a two-cycle internal combustion engine.

The flow of the fuel-air mixture from the carburetor into the crankcase of one class of two-cycle engines is controlled by the skirt of the piston, that is to say, as the skirt of the piston travels upwardly in the cylinder the lower edge thereof uncovers the intake duct communicating with the carburetor. The continued upward movement of the piston draws the fuel-air charge into the crankcase. If the bottom of the skirt is cut too high, the gas will merely flow back from the crankcase to the carburetor during the first portion of the downstroke of the the longest portion of the piston skirt adjacent to the in-piston. Accordingly, the practice is currently to position the longest portion of the piston skirt adjacent to the intake duct from the carburetor. A deficiency in this arrangement is that the charge begins to enter the crankcase relatively late in the cycle. The quantity of the charge is limited accordingly. While it is recognized that the initial upward travel of the piston creates an immediate pressure drop within the crankcase that will cause an initial rush of gas from the carburetor into the crankcase when the skirt clears the intake duct, the total flow available for the fuel-air mixture is also an important factor in determining the size of the charge.

Reed valves used in present internal combustion engines are normally located between the crankcase and the carburetor. However, the location of these valves causes the clearance volume (i.e. the lowest volume obtainable in the crankcase) to be relatively large. This limits the pressure that can be developed within the crankcase.

In view of these and other shortcomings of the prior art, it is one object of the present invention to provide an improved two-cycle engine and a piston wherein by merely removing the standard piston and replacing it with one in accordance with the invention, the size of the charge drawn into the combustion chamber can be substantially increased thereby improving the power output by at least 30% and in some cases as much as 50% of its original value.

Another object of the invention is the provision of an improved two-cycle internal combustion engine, fuel and air mixture flow control and valving arrangement which is economical to construct, is composed of relatively few parts and is effective in causing a substantial increase in the quantity of the charge drawn into the crankcase.

Another object of the invention is the provision of an improved two-cycle internal combustion engine valve containing piston wherein piston reciprocation will not interfere with the efficient movement of the valve element between the open and closed position.

Another object of the invention is the provision of an improved engine and piston arrangement for a two-cycle internal combustion engine wherein valve seating is accomplished by a combination of a spring action inertial seating and differential gas pressure.

A more specific object of the invention is the provision of an improved two-cycle engine and valve containing piston that is capable of efficiently improving power output throughout a wide range of engine speeds.

A further object of the invention is the provision of an improved valving arrangement for a two-cycle engine wherein an inlet valve is provided within the skirt of the piston which requires no mechanical operating mechanism for moving it between the open and closed positions.

These and other more detailed and specific objects of the invention will be apparent in view of the following specification and drawings wherein.

Figure 1:
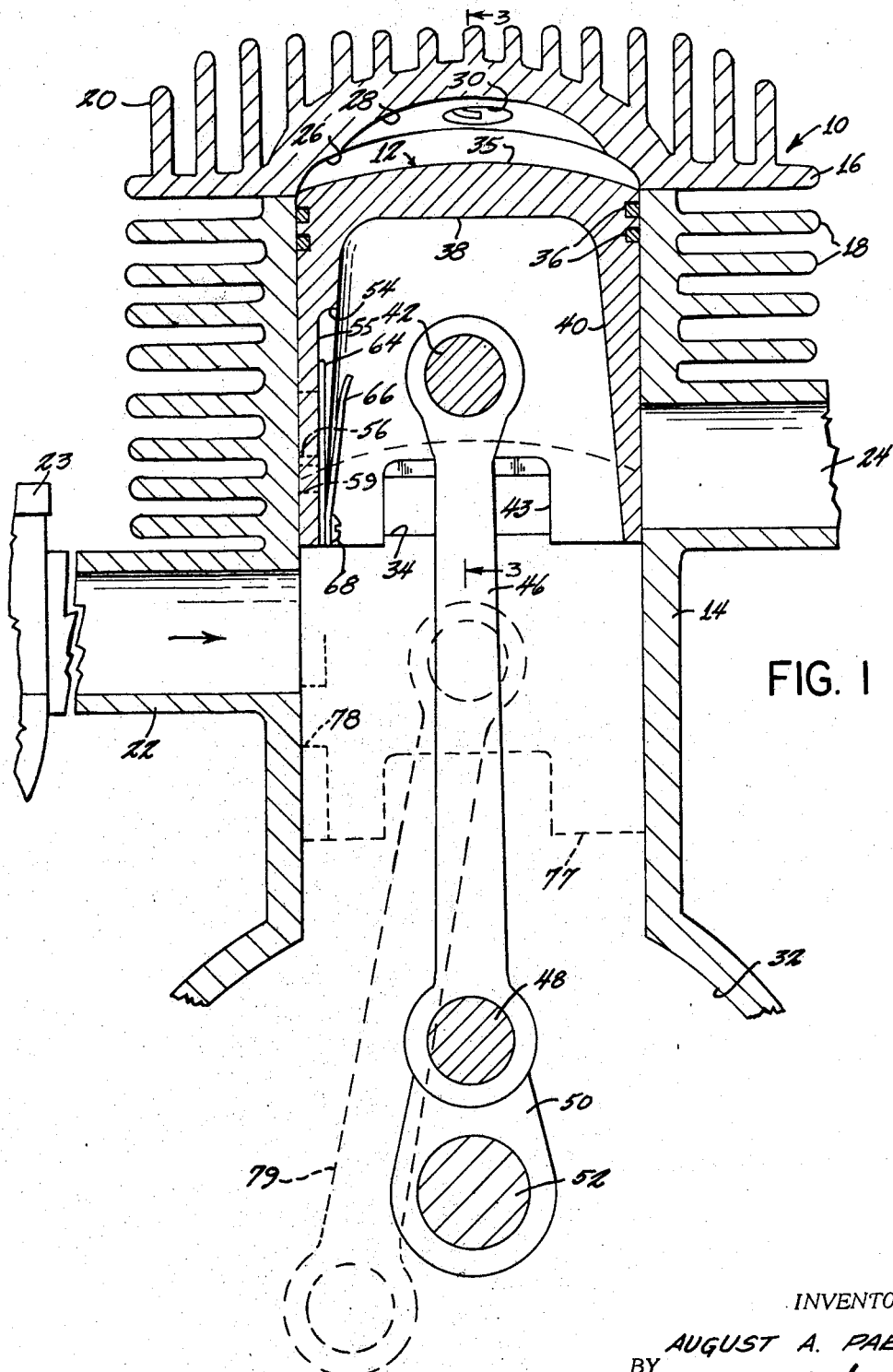
FIGURE 1 is a vertical cross sectional view of an engine embodying the invention.

Briefly stated, the present invention provides an improved two-cycle internal combustion and piston arrangement for controlling the flow of gas from the carburetor to the crankcase. An inlet port is provided in the skirt of the piston. A movable valve element adjacent the port allows the flow of gas only in the direction of the crankcase, i.e. towards the interior of the piston. In one embodiment of the invention, the valve element comprises a resilient reed valve secured to the skirt of the piston in a position overlapping the port thereby sealing the port when the valve element is in an undeflected position. In another embodiment of the invention, the valve element comprises a caged free-floating disk valve. The upper end of the inlet port is positioned so that it will begin to communicate with the intake duct leading to the carburetor just after the bypass port has been closed.

To the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

Referring now to the drawings there is shown a two-cycle internal combustion engine 10 which embodies the present invention. The engine is conventional in construction except for the piston 12. The engine includes the usual cylinder 14 and a cylinder head 16.

The cylinder 14 is provided with cooling fins 18 and the cylinder head with cooling fins 20. The cylinder is also provided with a gas-air mixture intake duct which communicates with the interior of the cylinder at one end and is connected to the carburetor 23 at the other end. The exhaust duct 24 is positioned to communicate with the interior of the cylinder at a somewhat higher elevation than bypass port 34, thus opening first during the downstroke of the piston so as to enable the exhaust gases to be expelled before a fresh charge is introduced.

The cylinder head 16 is provided with a generally hemispherical combustion chamber 26 having a centrally located domed recess 28 through which the spark plug opening 30 communicates.

At the base of the cylinder 14 is provided the usual crankcase 32 within which the fuel-air mixture is temporarily stored and compressed prior to being introduced into the combustion chamber. Introduction of the gas within the crankcase to the combustion chamber is accomplished through a bypass duct (not shown) of conventional construction that extends from the crankcase upwardly along the side of the cylinder and terminates at its upper end in a bypass port 34. Thus, during operation when the upper edge of the piston 12 passes downwardly below the bypass port 34, the compress fuel-air mixture within the crankcase 32 will flow upwardly through the bypass duct into the combustion chamber through bypass port 34.

The piston 12 has a domed head 35 and two piston rings 36. The lower surface of the piston head 38 is bounded on its edges by means of a tapered piston skirt 30 which is thinnest at its lower edge. It will be seen that the hollow interior of the piston communicates wtih the crankcase 32.

Figure 3:
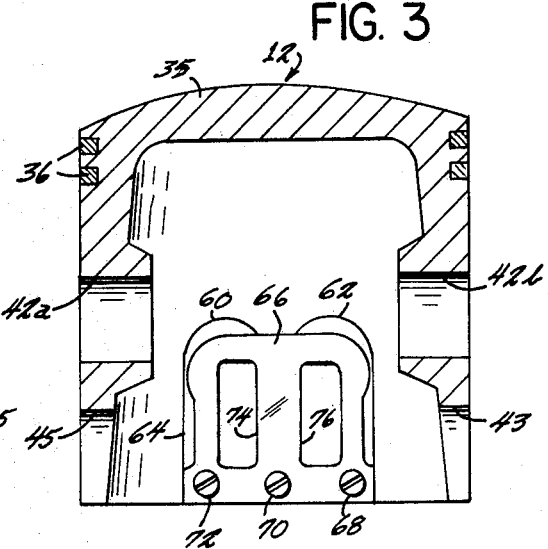
FIGURE 3 is a vertical cross sectional view taken on line 3—3 of FIGURE 1.

A wrist pin 42 is mounted for pivotal movement within journals 42a and 42b (FIGURE 3). The sides of the piston skirt are provided with two slots 43 and 45. A connecting rod 46 is coupled between the wrist pin 42 and the crankpin 48 of the crankshaft 50. The center of rotation of the crankshaft 50 is defined by the pin 52.

The construction of the valve in accordance with the invention will now be described in connection with FIGURES 1–3. The skirt 40 of the piston 12 is provided with a recess on its inner surface having a flat wall 55 adjacent to and surrounding bored inlet ports 56, 58, 59 and 61 which extend through the skirt 40 of the piston and communicate at times with intake duct 22. The ports 56, 58, 59 and 61 are normally sealed by means of a movable valve element 60 which consists of a thin flexible steel reed composed of two upwardly extending normally veritically disposed portions 62 and 64, each having a free rounded upper edge. The portions 62 and 64 are separated by means of a slot 65 (FIGURE 2). It will be seen that each of the sections 62 and 64 of the reed valve 60 extends over one vertically disposed pair of ports thereby normally sealing the ports. The reed valve 60 itself has the same construction as reed valves currently employed in the intake manifold of commercially available two-cycle engines. While one form of reed valve has been described in detail, any of the commercially available reed valves of the proper size can be used.

The maximum inward deflection of the valve element 60 is controlled by means of a stop 66 composed of a sheet metal plate secured together with the reed valve 60 itself to the piston skirt by screws 68, 70 and 72. The stop 66 is provided with two central openings 74 and 76 and is positioned to extend upwardly on a slight incline with its upper end at the greatest distance from the skirt.

Figure 2:
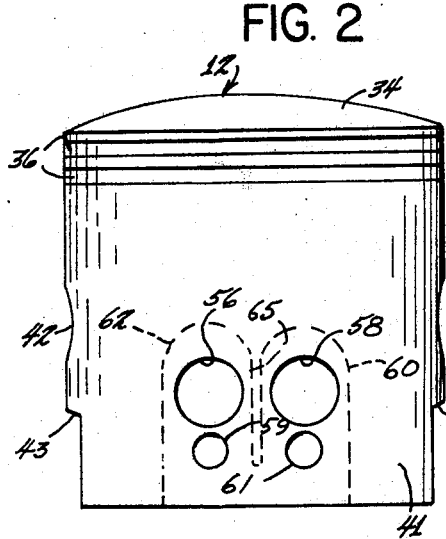
FIGURE 2 is a side elevational view of the piston of FIGURE 1.

During operation, the influx of gas through the ports 56, 58, 59 and 61 will deflect the upper end of the reed 60 toward the right in FIGURE 1 away from the ports thereby allowing gas to pass into the crankcase from the intake duct 22. When the piston 12 begins its downstroke there are three forces that tend to return the reed toward its closed position. First, there is the resiliency of the reed itself. Second, the connection of the reed at its lower end functions as a pivot. Thus, the downward acceleration of the piston will tend to return the free upper end of the reed to its seated position adjacent to the ports. Finally, gas pressure developed within the crankcase will assist in seating the reed valve.

When the piston 12 has moved to the dotted line position 77 of FIGURE 1, the connecting rod will be in the dotted line position 79 as the piston begins its upstroke. In position 77, the bypass port 34 will have just been closed. It should be noted that the port 56 will then be in the dotted line position 78 and will just begin to communicate with the intake duct 22. In this way, the fuel and air mixture is able to enter the crankcase much earlier in the cycle than it would if it were necessary for the bottom of the skirt 40 to clear the inlet duct 22. As soon as the inlet ports 56, 58, 59 and 61 clear the intake duct 22, the charge will begin to flow inwardly through ports 56, 58, 59 and 61 owing to the suction created in the crankcase caused by the upward travel of the piston. When the piston passes top dead center, the valve 60 will snap shut due to its own resiliency, the acceleration imparted by the downward travel of the piston and by the gas pressure building up within the crankcase 32.

Figure 4:
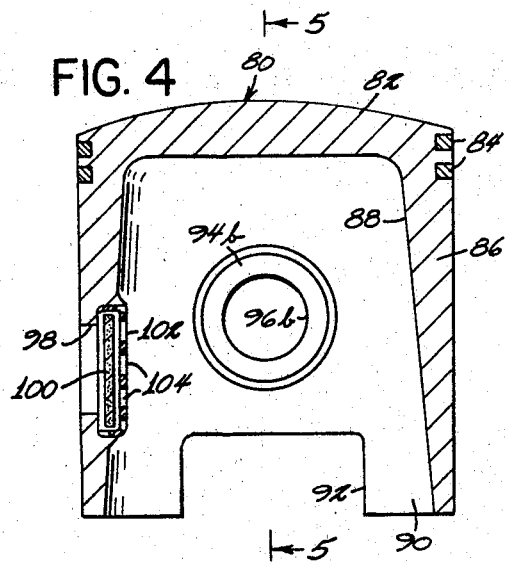
FIGURE 4 is a vertical cross sectional view of another form of piston in accordance with the invention.
Figure 5:
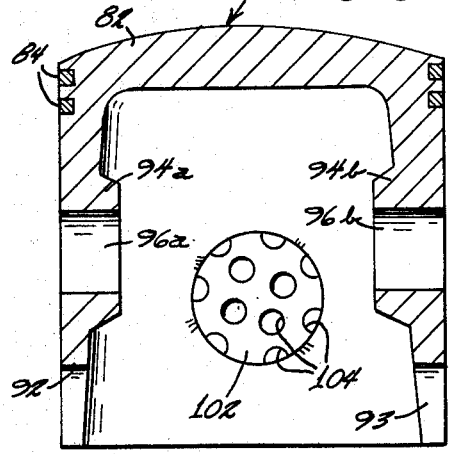
FIGURE 5 is a vertical sectional view taken on line 5—5 of FIGURE 4.

Refer now to FIGURES 4 and 5 which illustrate another embodiment of the invention. As seen in these figures, a piston 80 includes a piston head 82, piston rings 84 of conventional construction and a skirt 86 having an inner wall 88. The lower edge of the skirt 90 is provided with diametrically opposed slots 92 and 93 that extend upwardly a short distance from the lower edge of the skirt. A wrist pin (not shown) is journalled within conventional bosses 94a and 94b having coaxially bored openings 96a and 96b. Extending entirely through the piston skirt is a bored intake port of the same general type as the ports 56, 58, 59 and 61 of FIGURES 1–3, except that there is only one opening in this instance. The port 98 is sealed at times by means of a free moving disk valve element composed of a plastic impregnated fiber disk 100 supported within a cage 102 having openings 104. The cage 102 itself is rigidly secured to the inner wall of the skirt, for example by welding. Both the outer surface of the disk 100 and the adjacent surface of the skirt surrounding the inlet port 98 should be ground smooth to assure a gas-proof fit when the disk 100 is in the seated position abutting the inner edge of the port 98. The operation of the valve of FIGURES 4 and 5 is the same as FIGURES 1–3, except that the valve element 100 is moved between open and seated positions entirely by differential gas pressure.

Prototype engines embodying the invention have proved highly effective in operation. Comparative tests made by interchanging a conventional piston with one embodying the invention demonstrated at least a 30% and sometimes as great as 50% increase in torque during standard dynamometer tests. The invention, inexpensive to produce, can be embodied in any commercially available two-cycle engine of the type in which the fuel-air mixture timing is controlled by the skirt of the piston simply by replacing the piston normally used by one in accordance with the invention. It is important to note that because the movable valve 60 or 100 is located within the piston, the clearance volume in the crankcase is kept to a minimum. It should also be noted that no mechanical operating structure is required to move the valve element between open and closed positions.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A piston for a two-cycle internal combustion engine having a cylinder, an intake duct communicating with the cylinder, a crankcase comprising a piston body having a piston head and a cylindrical piston skirt, the interior of the piston communicating with the crankcase of the engine, said skirt having at least one inlet port extending entirely through the wall thereof from the outside surface of the piston to the interior of the piston and communicating when open through the interior of the piston with the crankcase of the engine, a movable valve element operatively associated with the inlet port for sealing the inlet port at times to permit the flow of gas through the port only in the direction from the outside surface of the piston through the piston skirt into the interior of the piston thereby allowing a gas to flow from the fuel air intake duct into the crankcase through the inlet port, said valve element being adapted to move to a closed position for sealing the inlet port to thereby prevent the escape of fuel-air mixture from the crankcase through the inlet port whereby the influx of the fuel-air mixture from the intake duct to the crankcase will begin at a point in the cycle of operation before the bottom of the piston skirt clears the intake duct.

2. The apparatus of claim 1 wherein the movable valve element comprises a reed valve.

3. The apparatus of claim 2 wherein the reed valve comprises a resilient sheet formed from relatively thin elastic material secured at its lower end rigidly to the lower edge of the skirt being free at its upper end, said valve element normally abutting against and sealing the inside surface of the inlet port and thereby preventing the flow of gas through the port in an outward direction and an upper free end of the valve element being adapted to be deflected to an open position away from the inlet port by the inward flow of the fuel and air mixture through the inlet port, the resiliency of the valve element, the downward movement of the piston and gas pressure within the crankcase being adapted to force the valve element toward a seated position sealing the inlet port.

4. The combination of a piston in accordance with claim 1 and a two-cycle internal combustion engine, said engine having a cylinder, a carburetor and an inlet duct communicating between the carburetor and the cylinder, a bypass duct communicating between the crankcase and combustion chamber, said inlet port in the skirt of the piston being positioned to first begin to communicate with the intake duct when the upper end of the piston seals the bypass duct whereby the continued upward movement of the piston will draw the fuel-air mixture into the crankcase through the inlet port.

5. The apparatus of claim 1 wherein a plurality of openings are provided in the skirt of the piston and said valve element comprises a resilient sheet metal reed positioned on the inside surface of the piston to extend over each of the openings.

6. The apparatus according to claim 5 wherein a stop provided within the piston is rigidly secured in a position for limiting the inward movement of the reed.

7. The apparatus of claim 1 wherein the valve element comprises a disk valve composed of a relatively thin flat element positioned to abut at times against the inward surface of the inlet port in the skirt of the piston, a cage surrounding disk to support the disk in position adjacent the inward surface of the inlet port and to permit limited movement of the disk away from the port whereby the influx of fuel-air mixture through the inlet port will be permitted only from the outside of the piston to the interior thereof.

8. The apparatus of claim 7 wherein the disk valve comprises a circular disk formed from a plastic impregnated fibrous material.

9. The apparatus of claim 1 wherein the valve element is a disk valve comprising a circular flat sheet formed from a plastic impregnated fibrous material positioned to abut at times against the inward surface of the inlet port and a cage surrounding disk to support the disk in position adjacent the inward surface of the port and permit limited movement of the disk away from the port whereby the flow of fuel-air mixture through the inlet port will be permitted only from the outside surface of the piston to the interior thereof.

References Cited

UNITED STATES PATENTS

| | | | |
|---|---|---|---|
| 541,773 | 6/1895 | Meao | 123—47 |
| 915,103 | 3/1909 | Meyer | 123—47 |
| 1,805,931 | 5/1931 | Taylor | 123—47 |
| 2,914,048 | 11/1959 | Philipp. | |
| 3,382,853 | 5/1968 | Kinoshita | 123—73 |

WENDELL E. BURNS, Primary Examiner

U.S. Cl. X.R.

123—47, 74